United States Patent
Bennis et al.

(10) Patent No.: US 6,907,392 B2
(45) Date of Patent: Jun. 14, 2005

(54) METHOD OF GENERATING A HYBRID GRID ALLOWING MODELLING OF A HETEROGENEOUS FORMATION CROSSED BY ONE OR MORE WELLS

(75) Inventors: Chakib Bennis, Rueil-Malmaison (FR); Sylvain Sarda, Rueil-Malmaison (FR); Eric Pain, Perrusson (FR); Sophie Balaven, Massy (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 896 days.

(21) Appl. No.: 09/725,254

(22) Filed: Nov. 29, 2000

(65) Prior Publication Data

US 2001/0006387 A1 Jul. 5, 2001

(30) Foreign Application Priority Data

Nov. 29, 1999 (FR) .............................................. 99 15120

(51) Int. Cl.[7] .................................................. G06G 7/57
(52) U.S. Cl. ........................................... 703/10; 702/11
(58) Field of Search .............................. 703/10; 702/2, 702/6, 11, 16; 367/69

(56) References Cited

U.S. PATENT DOCUMENTS

| | | | |
|---|---|---|---|
| 5,740,342 A | | 4/1998 | Kocberger .................. 395/120 |
| 5,764,515 A | * | 6/1998 | Guerillot et al. ................ 702/2 |
| 5,798,764 A | | 8/1998 | Akiyama ..................... 345/423 |
| 5,835,882 A | * | 11/1998 | Vienot et al. ................... 702/7 |
| 6,064,944 A | * | 5/2000 | Sarda et al. .................. 702/11 |
| 6,151,566 A | * | 11/2000 | Whiffen ....................... 703/10 |

FOREIGN PATENT DOCUMENTS

| | | | |
|---|---|---|---|
| GB | 2322702 | 9/1998 | ............ G01V/1/28 |
| WO | 9957418 | 11/1999 | ........... E21B/49/00 |

* cited by examiner

Primary Examiner—Albert W. Paladini
(74) Attorney, Agent, or Firm—Antonelli, Terry, Stout & Kraus, LLP

(57) ABSTRACT

A method of generating a hybrid grid allowing modelling of a heterogeneous formation crossed by one or more pipes such as, for example, an underground formation where one or more wells have been drilled, in order to form a representative model, for example of fluid flows in the formation in accordance with a defined numerical pattern is disclosed. The method comprises associating a first structured grid for gridding of the heterogeneous medium regarding discontinuities thereof with a second structured, radial type grid for gridding of a zone around each pipe or well, which allows better constraints linked with flows in the zone, and transition of non-structured grids that are interposed between the first grid and each second well grid. Various grids are combined, each with its own formation, representation and exploration methods, structured grids which are advantageous in facilitating control and comprehension of the reservoir images formed and more flexible non-structured grids for gridding of complex zones. An application is simulation of hydrocarbon reservoirs.

4 Claims, 6 Drawing Sheets

METHOD OF GENERATING A HYBRID GRID ALLOWING MODELLING OF A HETEROGENEOUS FORMATION CROSSED BY ONE OR MORE WELLS

BACKGROUND OF THE INVENTION

1. Field of the Invention

The present invention relates to a method of generating a hybrid grid allowing modelling of a heterogeneous formation crossed by one or more pipes.

The method of more particularly applied to formation of a grid suited to an underground reservoir crossed by one or more wells, in order to model displacements of fluids such as hydrocarbons.

2. Description of the Prior Art

Grid generation is a crucial element for the new generation of reservoir simulators. Grids allow description of the geometry of the geologic structure studied by means of a representation in discrete elements wherein simulation is performed according to a suitable numerical pattern. Better comprehension of physical phenomena requires 3D simulation of the multiphase flows in increasingly complex geologic structures, in the vicinity of types of singularities such as stratifications, faults, pinchouts, channels and complex wells. All this complexity has to be taken into account first by the grid which has to reproduce as accurately as possible to geologic information in its heterogeneous nature.

Grid modelling has made great advances during the past few years in other fields such as aeronautics, combustion in engines, structure mechanics, etc. However, the gridding techniques used in the other fields cannot be applied, as they are, to the petroleum sphere because the professional constraints are not the same. For example, in reservoir simulation, the numerical patterns are constructed from control volumes in order to better respect the mass conservation in the case of transport equations of hyperbolic nature. The grid must be a "block-centered" type grid, that is the nodes must be inside each layer and the boundaries of each block must follow the interface between the layers. Now, if this constraint was not taken into account, the nodes would naturally be placed along the faults and along the stratification boundaries. The consequence of this would be that these interfaces would pass through the control volume that is used. The saturation, constant in the control volume, could not consider discontinuity and the results would not be accurate. It is therefore necessary to develop new techniques that are better suited to requirements of the petroleum field.

Cartesian grids, which are commonly used in current commercial simulators, are not suitable for solving these new problems posed by the development of petroleum reservoirs. Cartesian grids, based on parallelepipedic elements, do not allow representation of such complex geometries.

There is a well-known method of generating structured 3D hexahedral grids of CPG (Corner-Point-Geometry) type which considers the geometry of the bodies, It is described in French patent 2,747,490 (U.S. Pat. No. 5,884,564) filed by the assignee and also in the following publication:

Bennis Ch. Et al. "One More Step in Gocad Stratigraphic Grid Generation: Taking into Account Faults and Pinchouts"; SPE 35526, Stavanger, 1996.

This grid type is more flexible than Cartesian grids because it consists of any hexahedral elements that can be degenerated. It strictly respects the horizons, the faults and it allows representation of certain nonconformities such as pinchouts because its construction is based on these elements. However, this type of grid does not allow solution of all the geometric complexities such as, for example, circular radial grids around complex wells. It is possible to form separately the grid of the reservoir and the girds around the wells but it is difficult to represent several objects in the same CPG type reservoir grid because of connection problems linked with the structured nature of the grid.

Another approach is also known where 3D grids only based on tetrahedral Delaunay elements, with a circular radial refinement around the wells, are automatically generated. The advantages of such an approach is that it is entirely automatic and does not practically not require the user's attention. However, this method has drawbacks which make the results obtained difficult to use:

there are on average five times as many grid cells as in a CPG type grid for the same structure, which is very disadvantageous for simulation calculations, unlike the structured grids which are easy to visualize, to explore from the inside and to locally modify interactively, it is very difficult and sometimes impossible to properly control the tetrahedral grids because of their size and especially because of their non-structured nature. This poses problems for validating the grid from a geometric point of view as well as for understanding and validating the result of a simulation of this type of grid.

Other approaches are also well-known, which allow generation of grids, notably grids based on control volumes generated from a triangulation (Voronoïand CVFE), associated with techniques of aggregation of the triangles (or tetrahedrons) into quadrangles allowing the number of grid cells to be reduced. Although promising results were obtained with these new grids, precise representation of the geologic complexity of reservoirs and wells remains a subject for research and development. In fact, these grids are rather 2.5D (i.e. vertically projected) and their 3D extension appears to be very difficult. Despite their hybrid aspect, they remain entirely unstructured and would therefore be very difficult to manage and to handle in real 3D. Furthermore, taking account of real 3D faults and deviated wells would greatly increase this difficulty.

SUMMARY OF THE INVENTION

The method according to the invention allows generation of a hybrid grid applicable to a heterogeneous formation crossed by at least one pipe of known geometry (such as an underground reservoir crossed by one or more wells), in order to form a model representative of fluids flows in the formation in accordance with a defined numerical pattern, the structure of the formation being known a priori from available data acquired by means of in-situ measurements, analyses and/or interpretations of formation images (seismic images for example, in the case of a reservoir).

The method comprises associating a first structured grid for gridding the formation with consideration of discontinuities thereof with second structured, radial type grids for gridding of the zones around the wells, these second grids allowing consideration of constraints linked with flows in the wells, and non-structured transition grids between the first grid associated with the formation and the second grids associated with the wells.

Gridding of the heterogeneous medium is obtained, for example, by importing each second structured grid into a cavity formed in the first structured grid, the size of the cavity being sufficient to allow formation of a non-structured transition grid between the first structured grid associated with the formation and the second structured grid associated with each well.

The non-structured transition grid based on any polyhedrons and canonical polyhedrons such as pentahedrons, tetrahedrons, pyramids, etc., can be formed by consideration of constraints linked with the numerical pattern.

The non-structured transition grids are advantageously modelled with the structured well grids by applying a technique known in the art, referred to as the "generalized map" technique, the grid of the formation being structured metrically, globally or in faulted blocks.

The global hybrid grid is thus obtained by combination of several grid types: a structured reservoir grid, a radial grid around each well, also structured, and non-structured transition grids which connect the previous two grid types. Each one of these grids has its own formation, representation and exploration methods. The structured aspect is thus degraded only at the points where this is strictly necessary. This "object" approach affords both the advantage of structured grids for control and comprehension of the reservoir and the flexibility of non-structured grids in complex zones. Complexity is introduced only where it is strictly necessary. The independence of these gridding modes therefore allows separate extraction, management and representation of the well grids and the interstitial grids includes in the reservoir grids.

Using a reservoir simulator of a well-known type, such as ATHOS™ or SCORE™ for example, for a reservoir provided with a hybrid grid obtained by means of the method, allows production simulations to be performed.

BRIEF DESCRIPTION OF THE DRAWINGS

Other features and advantages of the method according to the invention will be clear from reading the description hereafter of non limitative examples, with reference to the accompanying drawings wherein.

DETAILED DESCRIPTION OF THE INVENTION

Modelling of the reservoir is obtained by combining elementary grids of different types. Each grid is considered to be a full object with its own data model, its own generation methods and its own representation methods. Generation is carried out in stages with addition/subtraction of grids.

1) In order to represent the reservoir as a whole, an i, j, k structured grid of a known type, referred to as CPG (Corner Point Geometry), as described in the aforementioned French patent 2,747,490 for example is used. The reservoir can be faulted with downcreep of a block in relation to the other. The major horizons and faults are first modelled by continuous surfaces from data resulting from an interpretation of seismic images of the subsoil or from data obtained during drilling (well markers). The geologic structure is then divided into faulted blocks resting on these surfaces. These blocks are individually gridded, then reassembled. Gridding of a block first consists in gridding the edge surfaces, then the inside is populated by transfinite interpolation of the edge surface grids. Relaxation techniques are then applied to the edge surfaces and to the inside so as to harmonize and the regulate the grid. The grid thus obtained strictly considers the horizons, the faults and allows representation of nonconformities such as pinchouts. It meets all the constraints of geologic nature.

2) A well trajectory is drawn synthetically or imported. A structured radial grid is then generated around each well in order to take into account particular constraints linked with the flows in the vicinity of the wells.

Figure 1:
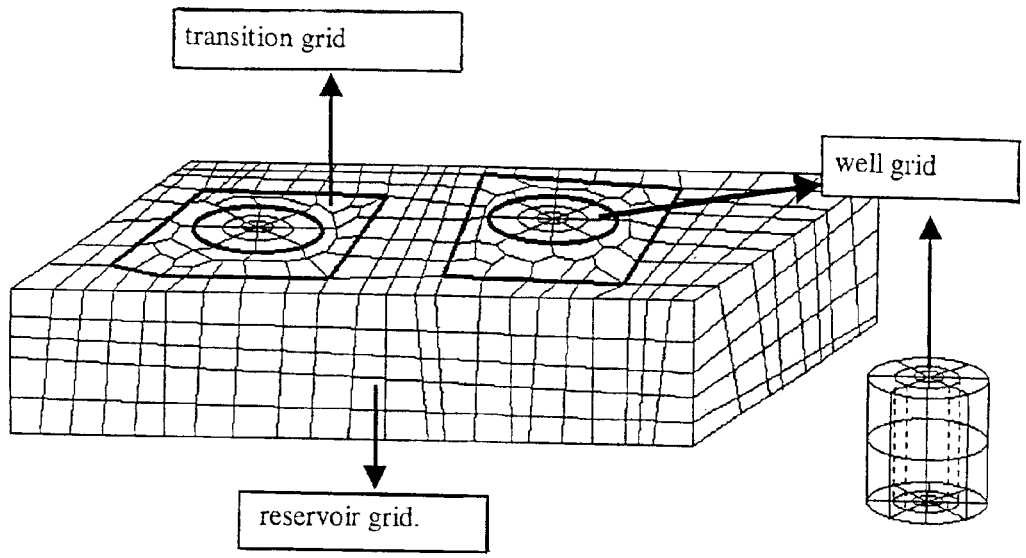
FIG. 1 shows a diagrammatic example of a hybrid grid of a reservoir crossed by two wells, consisting of a first structured grid for the reservoir, a second structured grid for the zones around the wells and transition grids between the two grid types.
Figure 2:
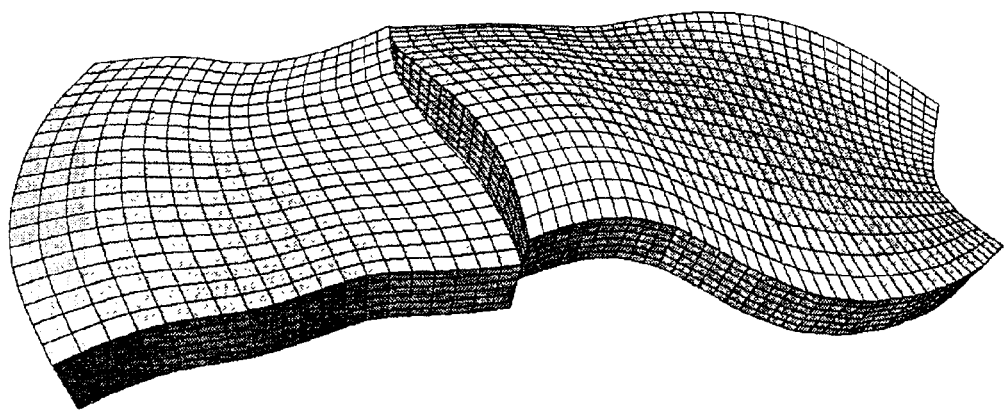
FIG. 2 shows an example of a structured grid of a faulted reservoir.
Figure 3:
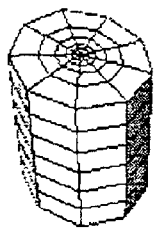
FIG. 3 shows an example of a radial grid around a vertical well.
Figure 11:
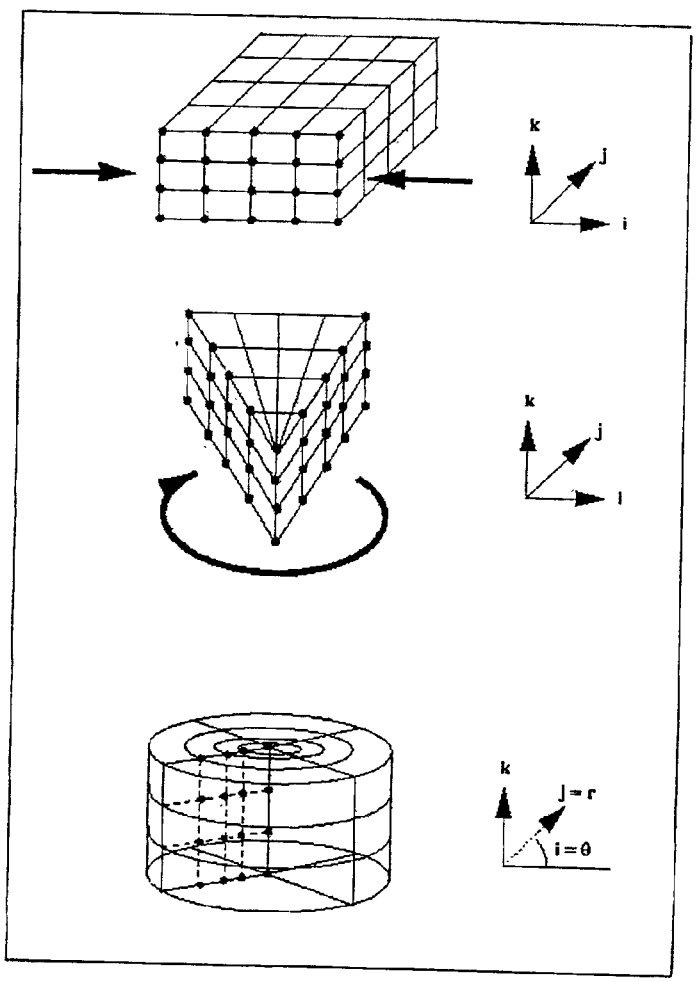
FIG. 11 shows a model for a matrical representation of a structured grid around a well.
Figure 12:
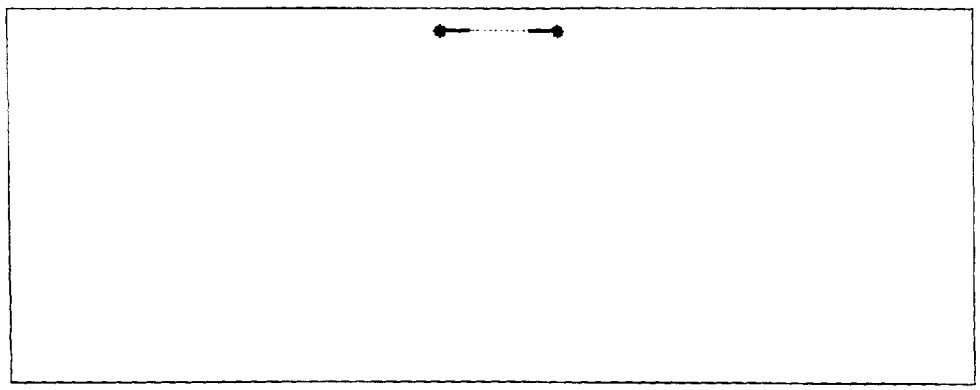
FIG. 12, is a graphic representation of a connection between strands, within the scope of the modeling technique referred to as the "generalized map" technique used for generating non-structured grids.
Figures 13A, 13B:
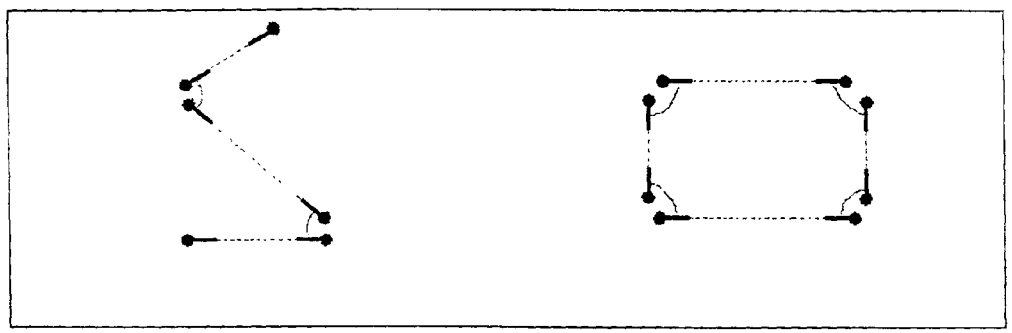
FIGS. 13A, 13B are graphic representations of connections by means of simple arcs.

In the example shown in FIG. 3, the structure grid around a vertical well is of circular radial type. It is also a CPG type grid. Its generation first consists in sampling a disc at r, θ in the horizontal plane. The 2D grid thus obtained is then projected vertically upon the various layers of the reservoir grid. Here, the i, j, k of the matrical structure correspond to the samplings at r, θ and z respectively (see FIG. 11).

Figure 4:
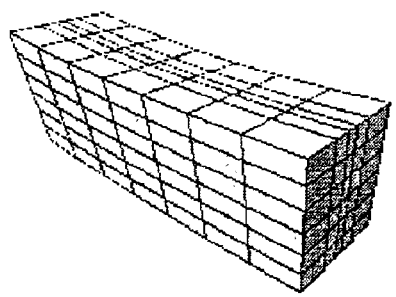
FIG. 4 shows an example of grid of a horizontal well.

The grid around a horizontal well (FIG. 4) is i, j, k structured, it is of the same type as that of the reservoir, except that a well cannot be faulted. It is also obtained by projecting vertically upon the various layers of the reservoir grid a 2D grid belonging to a horizontal plane.

Figure 5:
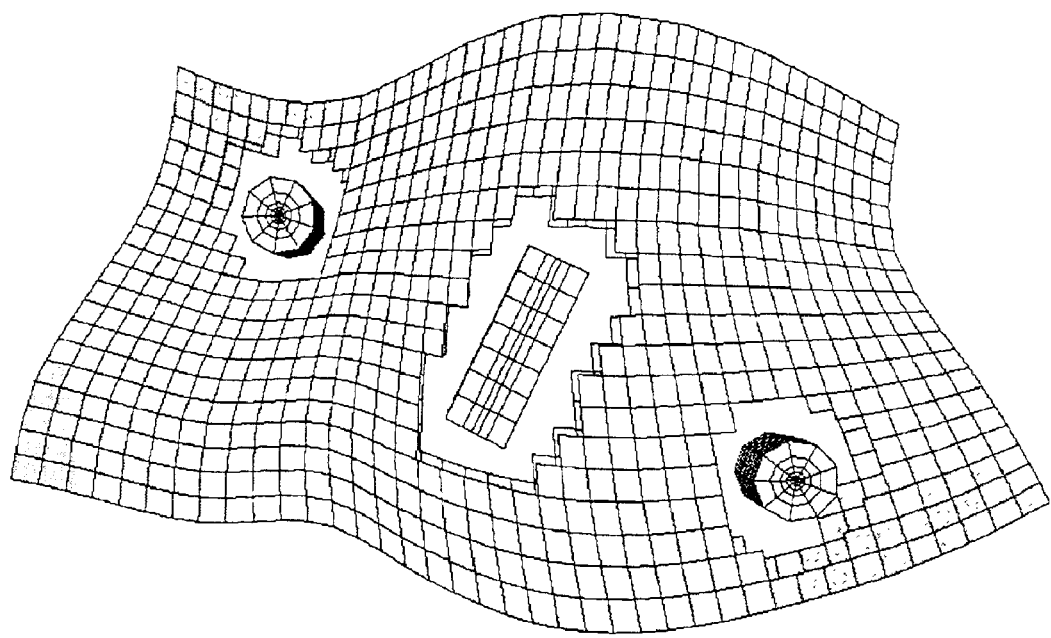
FIG. 5 shows, in 2.5D, an example of a gridded reservoir where cavities are provided for gridded wells, before the stage of creation of non-structured interstitial grids intended to connect them together.
Figure 6:
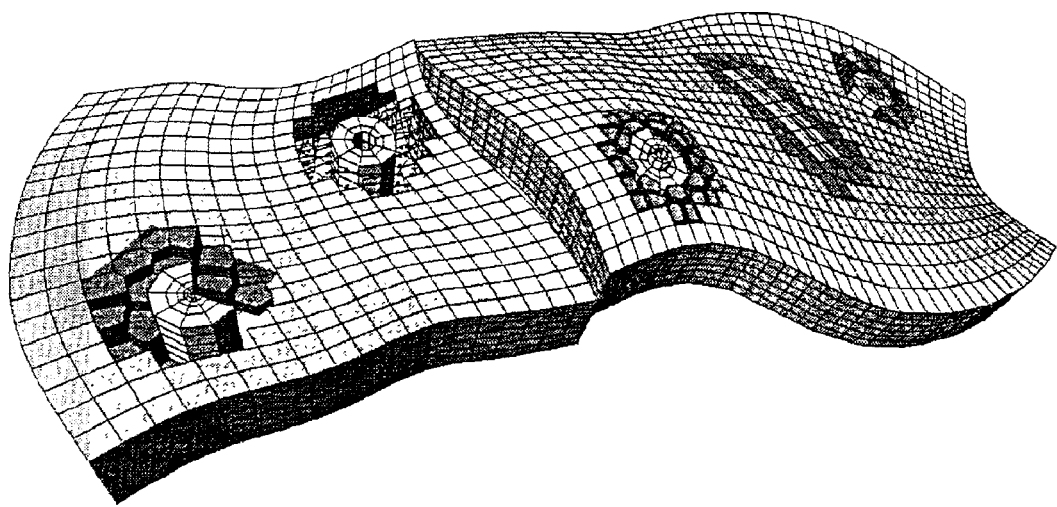
FIG. 6 shows five wells provided each with a radial grid, included in a gridded reservoir, by means of non-structured transition grids based on any polyhedral grid cells.
Figure 9A:
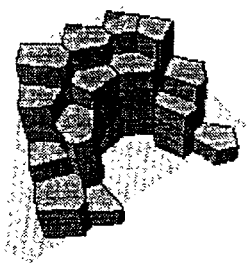
FIGS. 9A, 9B, 9C, 9D show various elementary transition grids, illustrated individually according to different modes, also, allowing their integration into the reservoir grid.
Figure 8A:
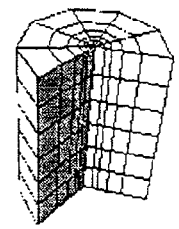
FIGS. 8A, 8B, 8C, 8D show elementary well grids illustrated individually according to different modes.
Figure 9B:
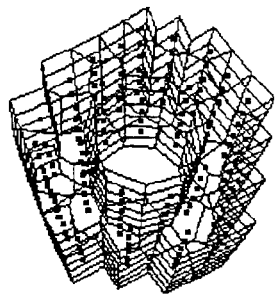
Figure 8B:
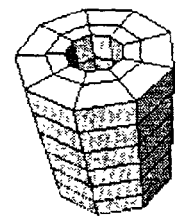
Figure 9C:
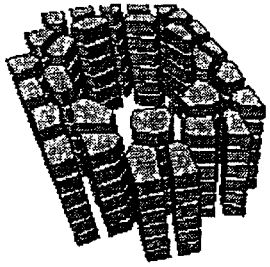
Figure 8C:
Figure 9D:
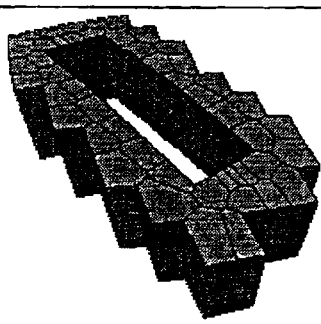
Figure 8D:
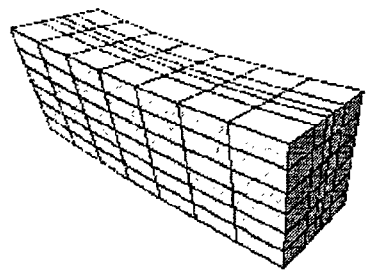
Figure 10:
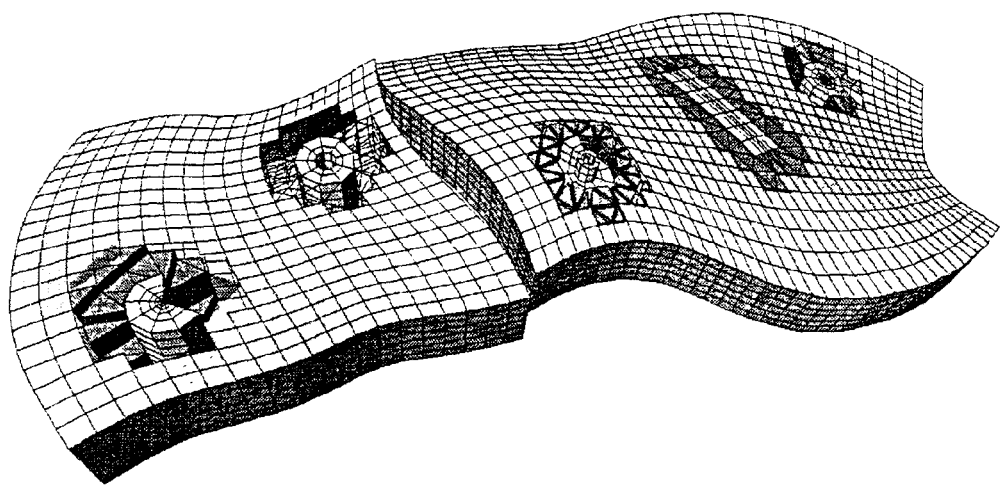
FIG. 10 shows an example of a hybrid reservoir grid with transition grids consisting for example of pentahedrons, between the reservoir grid and several well grids.

3) This radial grid is the inserted around around each well in the global reservoir grid. A cavity is therefore first created in the reservoir grid by deactivating all the grid cells in contact with well grid cells (FIGS. 5, 6). The space freed between the reservoir grid and the well grid must be sufficient to allow convenient formation of a transition grid. It can represent for example about the equivalent of two grid cell layers.

Figure 7:
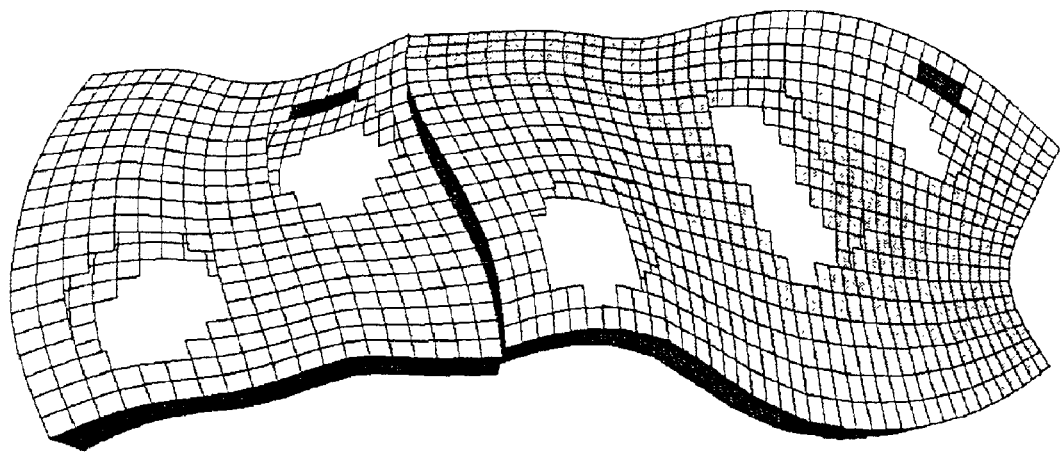
FIG. 7 shows separately the structured reservoir grid with the cavities provided therein in order to include the additional elements: gridded wells and interstitial grids.

4) A non-structured transition grid is then generated in this cavity (FIG. 7) in order to connect the structured radial grid around the well to that of the reservoir best respecting the constraints linked with the numerical pattern. The user can deactivate the grid of a well any time by reactivating the grid cells of the corresponding cavity in the reservoir grid.

The transition grid can for example consist of polyhedrons with any number of sides or canonical polyhedrons (tetrahedrons, pentehedrons, pyramids, etc.) according to the numerical pattern used, without the overall hybrid approach proposed being affected.

Example of Modelling of a Hybrid Grid

The reservoir grid and each well grid are modelled, for each faulted block of the reservoir, by matrical structures of points or cells each comprising eight points. Because of the structured nature of the grids, the topological links between the various grid cells are implicitly contained in the matrical structure.

Transition grids are more difficult to manage because of their non-structured nature and because they can contain polyhedral grid cells whose number of sides varies from one cell to the other.

An advantageous solution for facilitating management of this new grid type, allowing to browse it and to surf it efficiently, uses the topological model referred to as the "generalized maps or G-maps". This model known and for example described by:

Edmont J.: "A Combinatorial Representation for Polyhedral Surfaces", Notice Amer. Math. Soc., 7, 1960, or by:

Fortune S., 1992: Voronoi Diagrams and Delaunay Triangulations, pp. 225–265 of D. Z. Du & F. K. Hwang (eds.), Computing in Euclidean Geometry, $2^{nd}$ edn. Lecture Notes Series on Computing, vol. 4, Singapore, World Scientific.

Generalized maps are based on a formal algebraic approach that is briefly described hereafter.

Figures 14A, 14B:
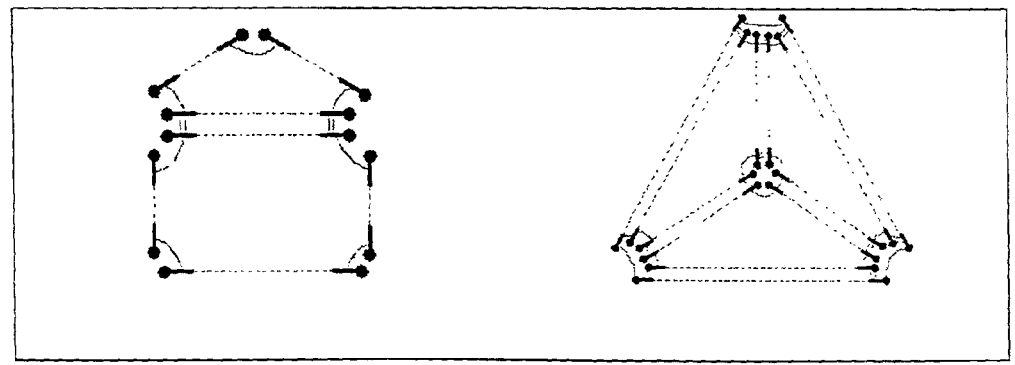
FIGS. 14A, 14B are graphic representations of connections by means of double or triple arcs respectively.

In 3D, the elements which constitute a generalized map are (D, $\alpha_0$, $\alpha_1$, $\alpha_2$, $\alpha_3$), where D is a finite set of elements called strands, and elements $\{\alpha_i\}$ are involution on D type functions, associating the strands two by two at most, which are therefore conveniently referred to as links. FIGS. 11 to 14 show specific geometric representation examples. Link $\alpha_o$ is in the form of a dotted segment (FIG. 11) and links $\alpha_1$, $\alpha_2$ and $\alpha_3$ in the form of arcs, respectively simple (FIG. 12), double (FIG. 13) and triple (FIG. 14).

According to another known approach, generalized maps are considered as graphs whose strands from the nodes and the links form the arcs: link $\alpha_o$ between two strands can be used for representing the edge of a side, links $\alpha_1$ for connecting two edges of a side, links $\alpha_2$ for linking two sides of a cell together and links $\alpha_3$ for connecting two cells together.

The model of generalized maps involves a small number of formal objects and an operation which, by associating additional information with a topology, allows location of the objects defined in space and accounting for their appearance, which is referred to as "plunge" and, in the present case, "plunge in a 3D space".

It affords the advantage of being independent of the dimension of the objects. All the objects can be represented with the same data structure and handled with the same methods. This approach makes it possible to handle objects created with heterogeneous topological models. It is therefore wellsuited for implementing the method according to the invention with creation of a non-structured grid linking two different structured grids together.

The generalized map technique for modeling the transition grid is applied by creating a number of objects of different types which refer to one another. These objects define the topological network and its various plunges in a 3D space. Specifically, in order to allow browsing the grid, a topological network is constructed parallel to the geometric data commonly handled in a grid, the points, the edges, the sides and the cells. Furthermore, crossed links are established between the topological network and geometric data.

Objects

The various objects handles within the scope of the application performed here of the generalized map method are as follows:

1) The Transition Grid object which contains all the topology, the geometry and the physical data. It is a GMap type object which represents the topological network and of a Plunge type object which defines the plunge in the physical world according to the application.

2) The GMap Object

The topological model is entirely contained in a graph of a list of Strands connected to one another. Any operation performed on the generalized map amounts to an operation of the Strands network. The GMap object type has methods allowing easy circulation in the topological network representing the grid, that is to go from one Strand to another.

3) The Strand Object

Each Strand is defined by four references to other Strands (corresponding to links $\alpha_o$, $\alpha_1$, and $\alpha_3$) and by four other references to the plunge in the 3D space, notably at a Point, an Edge, a Side and at a Cell to which it is connected.

4) The Plunge Object

It is defined by four lists:

a list of Points (the grid points), it is the plunge of dimension 0 of the GMap, a list of Edges (plunge of dimension 1 of the GMap), a list of Sides (plunge of dimension 2 of the GMap), and a list of Cells (plunge of dimension 3 of the GMap).

The Plunge object also contains its own methods of creating and handling the data it contains according to the use that is made thereof. The GMap is created from its Plunge.

5) The Point Object

A Point is defined by its coordinates x, y, z and by a list of attributes, notably scalar or real petrophysical values that are associated therewith.

6) The Edge Object

It is defined by a reference in the GMap to a Strand which represents an end of the Edge. This gives a preferential access to the topological network and simultaneously allows going from the plunge to the strands graph. For example link $\alpha_o$ of the Strand in question leas to the Strand representing the other end of the Edge. It is furthermore defined by a list of attributes, notably scalar or real petrophysical values that are associated therewith.

7) The Side Object

This type of object allows handling directly the interfaces between the cells as well as the outer sides of the grid. A side is defined by a reference in the GMap to a Strand which represents a vertex of the edge polygon of the Side. This also gives a preferential access to the topological network. The Strands representing the other vertices of the polygon are accessible by iterative applications of the relation $\alpha_o \circ \alpha_1$ by starting from the initial Strand and eventually coming back to this same Strand. It is also defined by a list of attributes relative to the Side (for example, scalar or vector physical values).

8) The Cell Object

The type of Cell abject is defined by a list of references in the GMap to Strands, each on representing a half-Side of the Cell. This allows access to the topological network from the Cells. It is also defined by a site (coordinates of the center of mass of the Cell) and by a list of attributes specific to the Cell or to its site (scalar or vector petrophysical values for example).

Graphical Representation and Exploration

A graphical representation is a very efficient and even essential means for controlling and validating the construction of a grid and the simulation results. Concerning the constructions, the geometry of the grid generated is generally first visually controlled. If this is not sufficient, local or global quality criteria with which statistics are established can be calculated and visualized on the grid by means of a color scale. Flow simulation calculates the variations with time of certain petrophysical parameters by accounting for the hypotheses that initially condition the flows. Simulation validation also involves visualization of these parameters on the grid (preferably by means of a colour scale). As the involved grids are 3D grids, tools allowing exploration of the grid from the inside by visual browsing are required. Graphical representation and browsing in the grids, presented hereafter, are a good illustration of the flexibility and the modularity of the hybrid approach proposed and of the efficiency and the adequacy of the data model selected.

The hybrid grid is considered as a set of independent entities. The elementary grids is constantly seen in a main window. The user can select at any time an elementary grid and see it with its specific methods in a secondary window which contains only the selected elementary grid. Actions on the elementary grid have automatically repercussions on the entire hybrid grid seen in the main window. An elementary grid can thus be seen and explored as a full entity and it can be viewed in the global context. The visualization methods differ according to whether the elementary grid is structured (reservoir grid and well grids) or not (transition grids).

Examples of Functionalities Specific to Structured Grids

In the case of a structured grid (reservoir and well), visualization is simple and conventional. It consists in two main functionalities:

visualization of the external envelope of the grid with the possibility of peeling it in the 3 directions i, j, j separately, simultaneous or separate viewing of three matrical cell slices i=cste, j=cste and k=cste, with the possibility of moving slices in the block.

Examples of Functionalities Specific to Non-Structured Grids

In the case of non-structured transition grids, other, more elaborate visualization modes are preferably used. Five functionalities are mainly used:

viewing of the external envelope with the possibility of concentric peeling, topologically speaking, viewing of the cells crossed by cutting plane orthogonal to an axis of coordinates x, y, z or any axis, viewing of the trace of the cells on the cutting plane, viewing of the grid sites when they are initially given and viewing of the grid cells in full or scattered mode.

Of course, for the two grid types, it is possible to view a property or scalar value by means of a color scale.

All these functionalities require easy and optimum viewing of a nonstructured grid. This is possible by using the generalized map technique.

FIGS. 7 to 10 clearly illustrate the potential afforded by the hybrid grid that is harmonious integration of a structured grid following a topological model (well grid) into another structured grid (reservoir grid) following a different topological model, by means of a non-structured transition grid. The independence of these models therefore allows extraction and separate representation of the well grids and of the interstitial grids included in the reservoir grid in order to represent, handle and explore this type of data.

What is claimed is:

1. A method of generating a hybrid grid applicable to a heterogeneous formation crossed by at least one pipe or at least well of known geometry, in order to form a model representative of fluid flows in the formation in accordance with a defined numerical pattern, structure of the formation being known a priori from available data acquired through in-situ measurements, analyses and/or interpretations of images of the formations, comprising:

generating a first structured grid to grid the formation by consideration of discontinuities thereof;

generating at least one second structured radial type grid to grid the zones around the at least one well or the at least one pipe, the second grid allowing consideration of constraints linked with flows in the at least one well or the at least one pipe;

associating the first and second structured grids;

forming at least one unstructured transition grid by applying using a generalized map processing; and generating a hybrid grid by inserting the unstructured transition grid between the first structured grid and each second structured grid.

2. A method as claimed in claim 1, wherein:

the second structured grid is imported in a cavity, a size of the cavity allowing formation of a unstructured transition grid between the first structured grid associated with the formation and the second structured grid associated with each well or pipe, the unstructured transition grid being formed by consideration of constraints linked with the numeral pattern and the first grid being metrically structured, globally or by faulted blocks.

3. A method for simulating, in accordance with a defined numerical pattern, evolution of a process in a heterogeneous medium crossed by at least one pipe or at least one well of known geometry, structure of a formation in the medium being known a priori from available data acquired through in-situ measurements, analysis and/or interpretations of images, of the formation comprising;

generating a first structured grid to grid the formation by consideration of discontinuities thereof;

generating at least one second structured radial type grid to grid zones around the at least one well or the at least one pipe, the at least one second structured radial type grid allowing consideration of constraints linked with flows in that at least one well or the at least one pipe;

associating the first and second structured grids;

forming at least one unstructured transition grid by applying a generalized map process;

generating a hybrid grid by inserting the at least one unstructured transition grid between the first structured grid and each second structured grid; and solving the numerical pattern in the hybrid grid formed for the formation.

4. A method in accordance with claim 3 wherein:

the evolution of the process involves fluid flows.

* * * * *